(12) United States Patent
Bauer

(10) Patent No.: US 9,533,609 B2
(45) Date of Patent: Jan. 3, 2017

(54) VEHICLE SEAT WITH A VENTILATING DEVICE

(71) Applicant: I.G. BAUERHIN GMBH, Gruendau (DE)

(72) Inventor: Stefan Bauer, Alzenau (DE)

(73) Assignee: I. G. BAUERHIN GMBH, Gruendau (DE)

( * ) Notice: Subject to any disclaimer, the term of this patent is extended or adjusted under 35 U.S.C. 154(b) by 0 days.

(21) Appl. No.: 14/946,832

(22) Filed: Nov. 20, 2015

(65) Prior Publication Data
US 2016/0144754 A1 May 26, 2016

(30) Foreign Application Priority Data
Nov. 25, 2014 (DE) .................... 20 2014 009 326 U

(51) Int. Cl.
*B60N 2/56* (2006.01)
(52) U.S. Cl.
CPC ............. *B60N 2/5642* (2013.01); *B60N 2/565* (2013.01)
(58) Field of Classification Search
CPC ......... B60N 2/5642; B60N 2/565; B60N 2/56; B60N 2/70
USPC ...................... 297/180.14, 180.13
See application file for complete search history.

(56) References Cited

U.S. PATENT DOCUMENTS

| | | | | |
|---|---|---|---|---|
| 7,261,371 B2* | 8/2007 | Thunissen | ............... | B60N 2/56 297/180.14 |
| 7,478,869 B2* | 1/2009 | Lazanja | ............... | B60N 2/5635 297/180.13 |
| 2002/0003363 A1* | 1/2002 | Buss | .................... | B60N 2/5635 297/180.14 |
| 2002/0105213 A1* | 8/2002 | Rauh | .................. | B60H 1/00285 297/180.14 |
| 2006/0175877 A1* | 8/2006 | Alionte | .................... | A47C 7/74 297/180.14 |

FOREIGN PATENT DOCUMENTS

| | | | |
|---|---|---|---|
| DE | 102012011398 A1 | 6/2012 | |
| DE | 102012006074 | * 11/2012 | ............. B60N 2/565 |

* cited by examiner

*Primary Examiner* — Milton Nelson, Jr.
(74) *Attorney, Agent, or Firm* — Karl F. Milde, Jr.; Eckert Seamans Cherin & Mellott, LLC

(57) ABSTRACT

A motor vehicle seat with a ventilating device comprises (a) a ventilating insert (5) that is placed into a recess on the side of an upholstery core facing a seated person, (b) an air-permeable upholstery layer covering the side of the ventilating insert facing the seated person, and (c) a ventilator (12), at least partially inserted into an indentation in the side of the upholstery core facing the seated person, that sucks in the air from partial areas of the seating surface and provides it to those partial areas. At least a portion of the air flow between the ventilator and the upholstery covering occurs via an air-distribution layer (10) of the ventilating insert (5).

12 Claims, 7 Drawing Sheets

VEHICLE SEAT WITH A VENTILATING DEVICE

BACKGROUND OF THE INVENTION

The present invention relates to a seat for a motor vehicle, such as an automobile, with a ventilating device for seat comfort.

Such a vehicle seat with a ventilating device comprises a ventilating insert located within a recess on the side of an upholstery core facing a person sitting in the seat. The one side of the ventilating insert facing toward the seated person is covered by the upholstery covering of the seating surface that is air-permeable, for example in the form of an air-permeable fabric or a perforated leather cover. A ventilator is provided that is at least partially inserted into an indentation in the side of the upholstery core facing the seated person. In order to ventilate the seating surface, this ventilator sucks in air from partial areas of the seating surface and provides air to partial areas of the seating surface. For this, at least a portion of the air flow between the ventilator and upholstery covering passes via an air-distribution layer of the ventilating insert.

A automobile seat with a ventilating device of this type is known, for example, from DE 10 2012 006 074 A1. The automobile seat described therein comprises a tub portion formed as a closed shell, into which upholstery is inserted, that is provided with an air-distribution layer facing the seated person that is covered by an air-permeable covering. The air-distribution layer possesses a uniform texture across its entire surface. The air-distribution layer is provided with air, flowing via flow channels in the upholstery, by means of a ventilator mounted on the underside of the upholstery, also within the tub portion. The distribution chamber mounted between the ventilator and the air-flow channels to distribute the air to the air-flow channels is limited on its underside by the floor of the tub portion. These air-flow channels extend through the upholstery and/or upholstery layer from the underside to the upper side. While the two outer areas are provided with air via the air-flow channels, air is sucked out from the central portion of the air-distribution layer by means of the ventilator. Air-flow direction from the ventilator may be reversed so that air is provided to the central portion of the seating surface by means of the ventilator and the air-distribution layer while air is sucked in via the outer area of the air-distribution layer and thus of the seating surface. The figures in this reference show that, due to the arrangement and structure of the air-distribution layer and of the channels within the upholstery, air is partially guided such that it is provided by the ventilator on the one side and is directly sucked out of the air-distribution layer without flowing out through the seating surface, namely in the manner of a circulating system, when the surface facing the seated person is completely covered.

DE 10 2012 011 398 A1 discloses a vehicle seat with a shell or tub-shaped supporting structure into which an upholstery element is inserted whose upper side is covered with an air-permeable covering. An air-distribution layer is located below the seat cover which, in turn, is covered on its side facing the upholstery covering by an optional comfort layer, that may be formed of perforated or reticulated foam, for example. An upholstery component is located below the air-distribution layer.

Air-flow channels extend through this upholstery component perpendicular to the seating surface. A ventilator is mounted in a central portion of the upholstery elements, and/or of the upholstery component, that sucks in air via the seat cover and the comfort layer, passing this air below the upholstery component, via an air-distribution chamber formed partially by the floor of the tub-shaped supporting structure, to the air-flow channels in the upholstery component. From there, the air is passed via the air-distribution layer to the aperture in the comfort layer, from which the air exits from the seat cover.

SUMMARY OF THE INVENTION

A principal objective of the present invention is to provide a vehicle seat with a ventilating device that meets the requirements imposed on the air conditioning of a vehicle seat, and that particularly may be matched to requirements of its basic structure.

This objective, as well as further objectives which will become apparent from the discussion that follows are achieved, according to the present invention, by dividing a ventilating insert of the ventilating device crosswise or longitudinally to the seat direction into at least one first section of the surface and at least one second section of the surface, whereby the seat direction corresponds from front to rear to the vehicle longitudinal direction. The air flow of each section of the surface is separated.

At least one first section of the surface includes an air-distribution layer connected to the intake side of the ventilator. Air sucked in through the seating surface flows to the ventilator via this air-distribution layer. The air-distribution layer possesses dimensions that are matched to the areas of the seating surface within which air conditioning will occur by means of the suction of air. The air-distribution layer advantageously possesses a surface dimension that is somewhat smaller than the seating surface. The ventilator provides at least a portion of the air sucked in through at least one the first section of the surface via at least one the second section of the surface to the seating surface. Resultantly, ventilation of the seating surface is provided both through suction of air and through provision of air to the seating surface. The air is preferably sucked out of the portion of the seating surface that is directly covered by parts of the body of the seated person, while air is provided to the portion of the seating surface that has no direct contact with the person.

In one preferred embodiment, the vehicle seat is structured such that the ventilating insert includes an upper-side cover layer on its side facing away from the upholstery core and a lower-side cover layer on its side facing toward the upholstery core.

In an advantageous embodiment, air is at least partially passed from the ventilator to at least one second section of the surface via a recess that forms at least a portion of the channel, and is formed within the upholstery core on its side facing toward the seated person. This recess is either covered directly by a matching section of the surface lying on it so that the recess and the section of the surface are at least partially directly in the flow, or that the recess is covered by a layer, so that the air flows via the channel thus formed to the area of the air-distribution layer of the section of the surface from which air is sucked, or to which air is provided.

In another advantageous embodiment, the air provided by the ventilator to at least one second section of the surface may also be at least partially guided to an air-distribution layer mounted in at least one second section of the surface in order to guide air to the provided areas.

In order that ventilating the seating surface of the automobile seat is pleasant to a person, the quantity of air provided to the seating surface by the ventilator must be less than the quantity of air that is sucked from the seating surface by the ventilator. To achieve this, a portion of the air sucked from the first section of the surface by the ventilator in an area assigned to the seat back is provided to the vehicle interior. If the driver's or front passenger's seat is involved, the air may be guided to the foot area between the front seat and the back seat, or the air may be guided forward under the seat such that it flows into the foot area of the person seated in the seat.

In an advantageous embodiment, the ventilating insert is limited by a frame-shaped insert that connects the upper-side covering layer and the lower-side covering layer together, as mentioned above. For this, the frame-shaped insert is formed of essentially non-air-permeable foam.

A minimum of one second section of the surface through which air is guided to the seating surface may also be formed of essentially non-air-permeable foam. In such a configuration of the second section of the surface, the air is provided through apertures and/or channels within the non-air-permeable foam to corresponding areas of the seating surface, or is sucked from these apertures or channels. The apertures or channels may extend from the lower side of the foam material through to the upper side. Alternatively, air within the foam material may be guided via channels on the underside of the foam material, which may partially be guided through recesses within the foam material.

It is also provided that the foam material of at least one second section of the surface forms a portion of the frame-shaped insert, and that this section of the surface is also non-air-permeable.

Another preferred embodiment, seen to be advantageous, is one in which pass-through apertures are provided in the foam material of at least one second section of the surface, whereby the ventilator provides air to the seating surface via the above-mentioned recess and/or via the channels thus formed.

Especially advantageous is a vehicle seat in which either at least two first sections of the surface and at least one second section, or at least two second sections of the surface and at least one first section of the surface, are provided, whereby a minimum of one section of the surface is located between a minimum of two other sections of the surface. Moreover, with an embodiment having at least three sections of the surface, these sections are oriented in the seating surface such that they are crosswise to the seating surface and thus crosswise to the vehicle longitudinal direction and adjacent to one another, and advantageously such that the two sections of the surface from which air is sucked from the seating surface by the ventilator are formed by the two outer sections of the surface that are the same as those by means of which air is provided by the ventilator to the seating surface.

The ventilator or air-moving device must be such that it possesses an appropriate number of intake openings matching the number of sections of the surface through which air is to be sucked out, and must possesses an appropriate number of exhaust openings matching the number of sections of the surface through which air is to be provided. A radial fan is preferably used that possesses an axial air-sucking opening and at least one radial air-exhaust opening. A diagonal ventilator is especially preferred because air is sucked into a diagonal ventilator axially but the exhaust is diagonal. A conical shape of the hub and a specific air flow within the outer housing may provide an exhaust angle of between zero degrees and 90 degrees with respect to the rotational axis. The circumferential velocity required for pressure build-up at the hub is increased by means of a hub diameter that increases along the flow direction. Resultantly, the diagonal ventilator can provide a greater pressure increase with the same outer dimensions and same rotational speed as an axial ventilator, and is quieter than a radial fan, and thus is to be preferred.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1A:
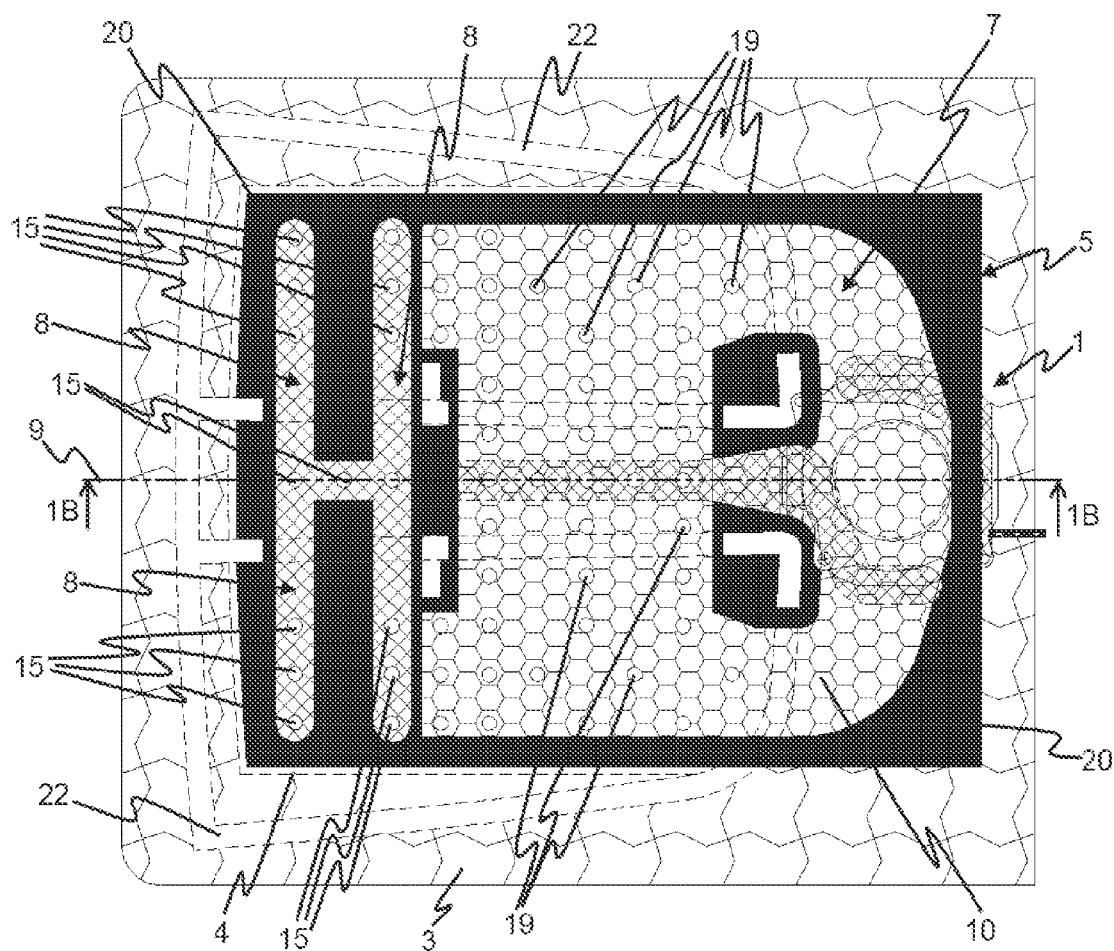
FIG. 1A is a schematic top view of a seating surface without a seat covering, according to a first preferred embodiment of the ventilating inserts per the invention.

The preferred embodiments of the present invention will now be described with reference to FIGS. 1-4 of the drawings. Identical elements in the various figures are designated with the same reference numerals.

Figure 1B:
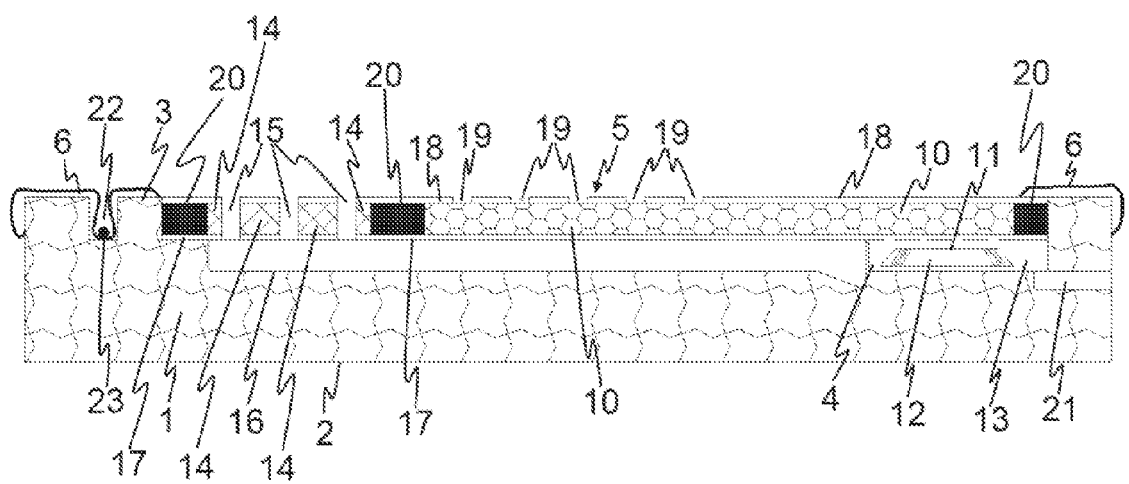
FIG. 1B is a cutaway view along the projection 1B-1B in FIG. 1A.

As FIGS. 1A and 1B show, the first preferred embodiment comprises a upholstery core 1 formed preferably of a foam material that rests in a vehicle seat with its underside 2 on the structure of a seat frame (not shown).

The seating surface of this set is equipped with a ventilating device in order to ventilate and/or evacuate the seating surface.

On the upper side 3 of the upholstery core 1, which faces toward the seating surface, a recess 4 is present into which a ventilating insert 5 is inserted, which is a component of this ventilating device. This ventilating insert 5 is covered on its upper side by an upholstery covering 6 that is air-permeable in partial areas assigned to the ventilating insert 5.

When viewed in the direction crosswise to the seat direction, the ventilating insert 5 in the embodiment shown in FIGS. 1A and 1B is sub-divided into at least one first section of the surface 7 and a second section of the surface 8. The air flow of the first section of the surface 7 and the second section of the surface 8 are separate; i.e., they are not connected for flow purposes.

The seat direction referred to above corresponds to the longitudinal vehicle direction, or to the direction of the seat back of the automobile seat to the front edge of the seating surface. In FIG. 1A, this longitudinal direction corresponds to the progression of the dotted projection line 9.

The ventilating insert 5 is configured in the first section of the surface 7 with an air-distribution layer 10 which involves an open-weave fabric or perhaps an open-pore foam material or a material through which air may flow.

As the cutaway view of FIG. 1B shows, this air-distribution layer 10 of the first section of the surface 7 is connected to the intake side 11 of a ventilator 12.

The ventilator 12 is inserted into an indentation 13 of the upholstery core 1, and is covered with the air-distribution layer 10. The ventilator 12 is thus located in the rear portion of the seating surface assigned to the seat back (not shown), and it may be partially or completely covered by the seat back.

The second section of the surface 8, which is located before the second section of the surface 8 when viewed along the longitudinal direction 9 of the automobile seat and is accordingly mounted in the area of the front portion of the seating surface, is configured with a non-air-permeable foam material 14 in the embodiment example of FIG. 1. Several pass-through apertures 15 are located within the foam material 14 that lead from the upper side of the second section of the surface 8 to its underside and correspondingly from the upper side to the underside of the ventilating insert 5.

A recess 16 is located below the ventilating insert 5 in the foam material 14 of the upholstery core 1 that leads from the ventilator 12 and/or the indentation 13 within which the ventilator 12 is mounted to the front portion of the upholstery core 1. This recess 16 branches into an H-shape below the second section of the surface 8 of the ventilating insert 5 so that it is connected with the pass-through apertures 15 in the second section of the surface 8 for the purpose of flow.

The recess 16 is covered by a lower-side covering layer 17 of the ventilating insert 5, which is non-air-permeable so that a suitable channel is created for air flow between ventilator and the pass-through apertures 15, whereby the pass-through apertures 15 in the second section of the surface 8 also extend through this lower-side covering layer 17.

As may be seen from the cutaway view of FIG. 1B, the ventilating insert 5 is also covered on its upper side, i.e., on the side facing toward the seating surface and is located beneath the upholstery covering 6 by an upper-side covering layer 18 with corresponding apertures in the area of the second section of the surface 8 to which the pass-through apertures 15 are assigned. Further, this upper-side covering layer 18 of the ventilating insert 5 possesses a large number of perforations or holes 19 in the area below which the first section of the surface 7 is located.

The ventilating insert 5 is limited about its circumference by a frame-shaped insert 20 that, in the illustrated embodiment example, is formed of an essentially non-air-permeable foam material 14, with which the second section of the surface 8 is also configured. The upper-side covering layer 18 and the lower-side covering layer 17 are attached to the upper side and underside of the frame-shaped insert 20 and to the foam material 14 of the second section of the surface 8, so that the air-distribution layer 10 is limited by the frame-shaped insert 20 and by the upper-side covering layer 18 and the lower-side covering layer 17.

During operation of the ventilating device, the ventilator 12 with its intake side 11 sucks air from the seating surface of the seat via the holes 19 in the upper-side covering layer 18 and the air-distribution layer 10, and provides this sucked air to the channel formed by the recess 16. This air is guided by means of the recess 16 in the area of the second section of the surface 8 and is distributed to the pass-through apertures 15 located there and is blown out through the seating surface.

It is apparent that the air flow might be reversed as necessary so that the ventilator 12 sucks air from the area of the second section of the surface 8 in the front portion of the seat, and this sucked air is passed via the air-distribution layer 10 and the correspondingly-matched apertures 19 in the area of the second section of the surface 8 by means of the upholstery covering 6. The essential thing is that the two sections of the surface 7 and 8 are separate for flow purposes so that air can be sucked from, and provided to, specific surface areas of the seating surface in a targeted manner. The described structure of the ventilating device allows modification of the ventilation properties of the seat by means of simple adjustment of the above-described ventilation concept.

The cutaway view of FIG. 1 further shows that the indentation 13 within which the ventilator 12 is mounted may be optionally connected via a channel 21 within the upholstery core 1, by means of which a portion of the air sucked in by the ventilator 12 from at least one first section of the surface may be provided to the vehicle interior through an area assigned to the seat back, in this illustrated example that space located behind the seat. This channel 21 may also be fed through the upholstery core 1 such that it leads to the underside 2 of the upholstery core 1 and thereby to the underside of the seat in order to give up a portion of the air sucked in through the seating surface.

It must be noted that the upholstery covering 6 in the area of the seating surface may be secured by means of tensioning grooves 22 and tensioning cables 23, as FIG. 1B shows.

Although the second section of the surface 8 is configured with an essentially non-air-permeable foam material 14, this second section of the surface 8 might be configured corresponding to the first section of the surface 7 with an air-distribution layer whereby this air-distribution layer is limited between the upper-side covering layer 18 and the lower-side covering layer 17 and the frame-shaped insert 20.

While the first section of the surface 7 and the second section of the surface 8 in FIGS. 1A and 1B viewed in longitudinal direction of the seat are located one behind the other, this minimum of two sections of the surface may also be positioned crosswise to the longitudinal direction of the seat whereby the orientation of the two sections of the surface as shown in FIGS. 1A and 1B is preferred. If, however, the two sections of the surface are positioned crosswise to the seat direction or to the longitudinal direction of the vehicle, then the second section of the surface 8 through which the air sucked through the first section of the surface 7 must extend to the side of the seat facing toward the side [covering] of the vehicle.

It should be noted that not all the components are described over again for each preferred embodiment discussed below if they were already described or explained above in connection with the first embodiment. Accordingly, the description of the various components of the first embodiment may be transferred to those components in another preferred embodiment without being specifically mentioned herein.

Figure 2A:
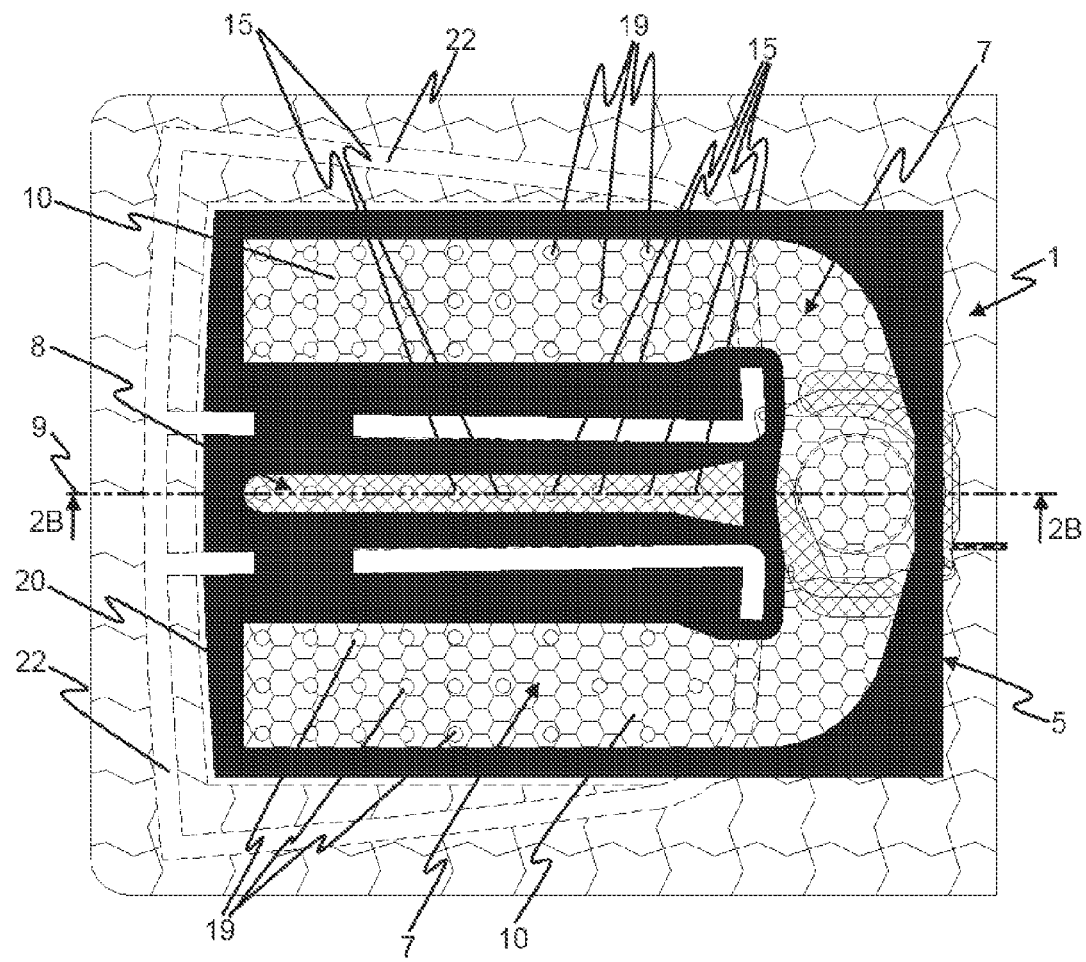
FIG. 2A is a top view of a seating surface as in FIG. 1A, according to a second preferred embodiment of the ventilating inserts per the invention.
Figure 2B:
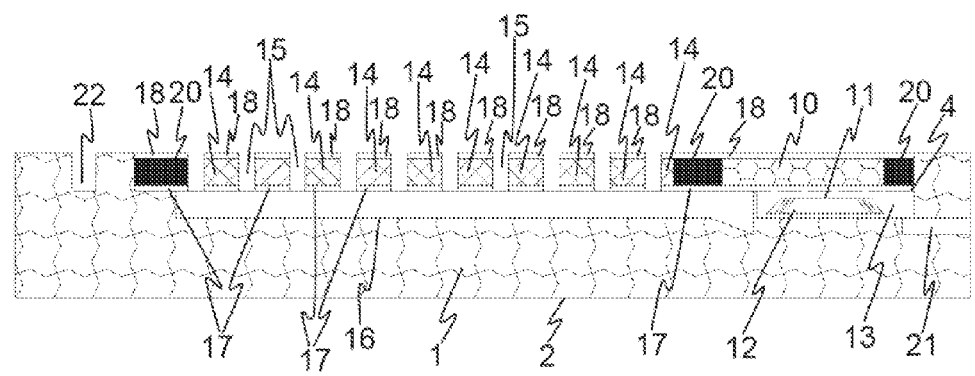
FIG. 2B is a cutaway view along the projection 2B-2B in FIG. 2A.

The second preferred embodiment of the automobile seat, as shown in FIGS. 2A and 2B, is distinguished from the first embodiment per FIGS. 1A and 1B in that the ventilating insert 5 is sub-divided into three sections of the surface that are separate from one another for flow purposes.

As is visible from FIG. 2A the ventilating insert 5 comprises two first sections of the surface 7 and a second section of the surface 8 whereby, when viewed perpendicular to the dashed line, the second section of the surface 8 extends between the two first sections of the surface 7. The two first sections of the surface 7, corresponding to the first section of the surface 7 of the embodiment example in FIG.

1A, is configured with an air-distribution layer 10 with a U-shape as seen from above in that the two first sections of the surface 7 are connected together at one of their ends. This connection area extends above the indentation 13 within which the ventilator 12 is mounted so that air is sucked via these first sections of the surface 7 into the intake of the ventilator 12. The second section of the surface 8 with the seating surface and/or the ventilating insert seen from above is implemented as a narrower, strip-shaped section of the surface, and is provided with a non-air-permeable foam material 14. Pass-through apertures 15 are located within this foam material 14 and extending vertically to the seating surface that, corresponding to the first embodiment example, are connected with the channel formed by the recess 16 within the upholstery core 1. Air from the ventilator 12 is provided to the pass-through apertures 15 via the recess 16 that has been sucked through the two first sections of the surface 7 of the seating surface.

The two first sections of the surface 7 are separated from each other on their outer sides by the frame-shaped insert 20, preferably of a non-air-permeable foam material 14.

The second section of the surface 8 may simultaneously be formed of this foam material 14 with the pass-through apertures 15.

The ventilating insert, as shown in the second embodiment per FIGS. 2A and 2B, is preferably installed in an orientation within the seating surface of a seat such that the three sections of the surface 7 and 8 lie crosswise to the longitudinal vehicle dimension corresponding to the dashed line and adjacent to each other whereby the ventilator 12 is located in the area of the seat back of the seat. In such orientation, the two outer, first sections of the surface 7 are assigned to that area of the seating surface that is covered by the legs of the seated person. The air is sucked into the seating surface from these first sections of the surface 7 and is then at least partially fed via the central, second section of the surface 8, i.e., through the legs of the seated person through the pass-through apertures 15. The portion of the sucked air may be fed directly into the vehicle interior via the channel 21 if such exists and not through the seat surface. With this configuration, extremely convenient ventilation of the seating surface is provided to the seated person.

Figure 3A:
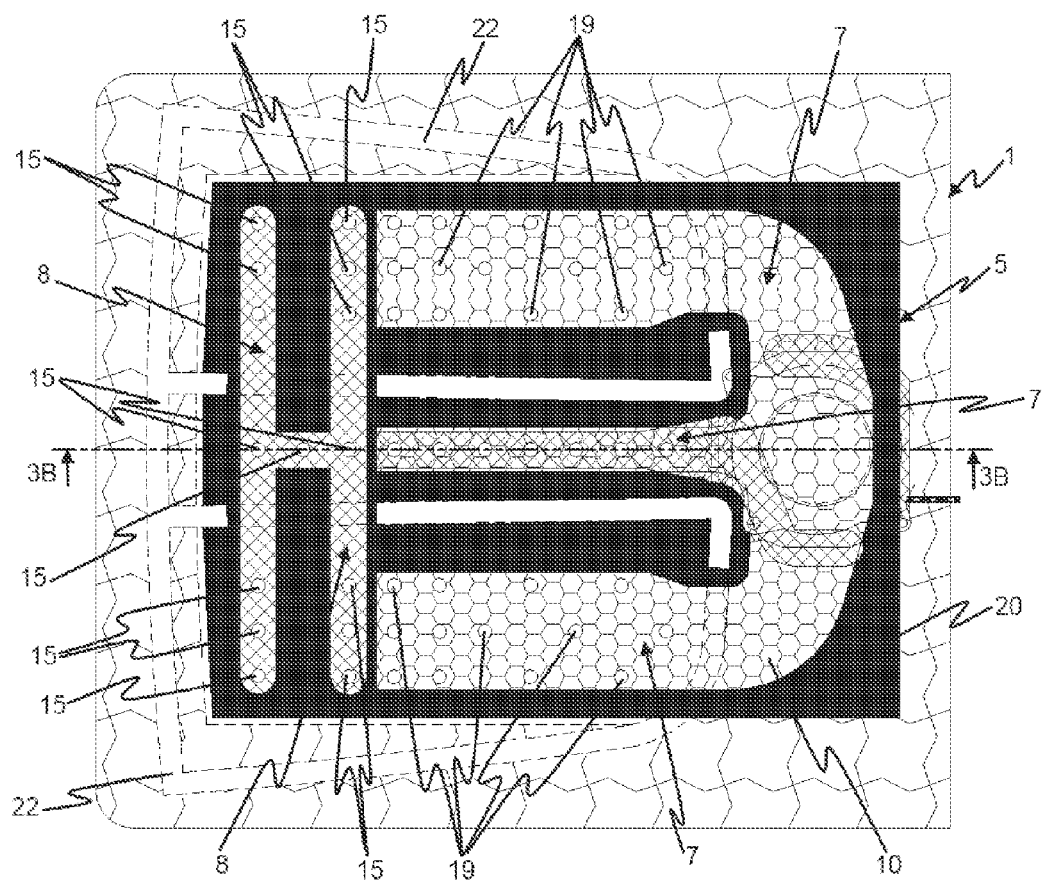
FIG. 3A is a top view of a seating surface as in FIG. 1A, according to a third preferred embodiment of the ventilating inserts per the invention.
Figure 3B:
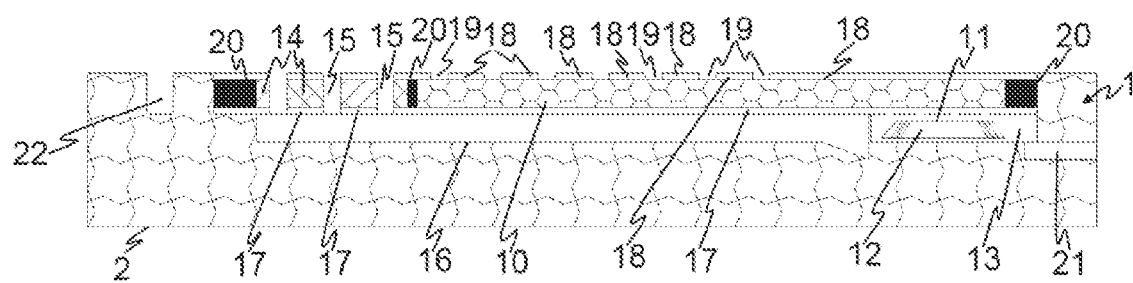
FIG. 3B is a cutaway view along the projection 3B-3B in FIG. 3A.

A third preferred embodiment of the automobile seat and/or of the ventilating inserts used therein, as shown in FIGS. 3A and 3B, represents a combination of the first embodiment per FIGS. 1A and 1B and the second embodiment per FIGS. 2A and 2B. The embodiment shown in FIGS. 3A and 3B also comprises two first sections of the surface 7 and a second section of the surface 8 corresponding to FIGS. 2A and 2B. However, the two first sections of the surface 7 as seen from the ventilator 12 along the dashed line 9 are shorter, comparable with the first section of the surface 7, as FIG. 1A shows. According to FIG. 1A, the second section of the surface 8 extends into the front area of the seating surface and there branches into a T- or H-shape. The second section of the surface 8 is again configured of an essentially non-air-foam material 14 with the pass-through apertures 15.

As mentioned above, the second section of the surface 8 in the individual embodiment examples may also be configured by means of an air-distribution layer 10, for example in the form of an open-weave fabric or air-permeable foam materials.

Figure 4:
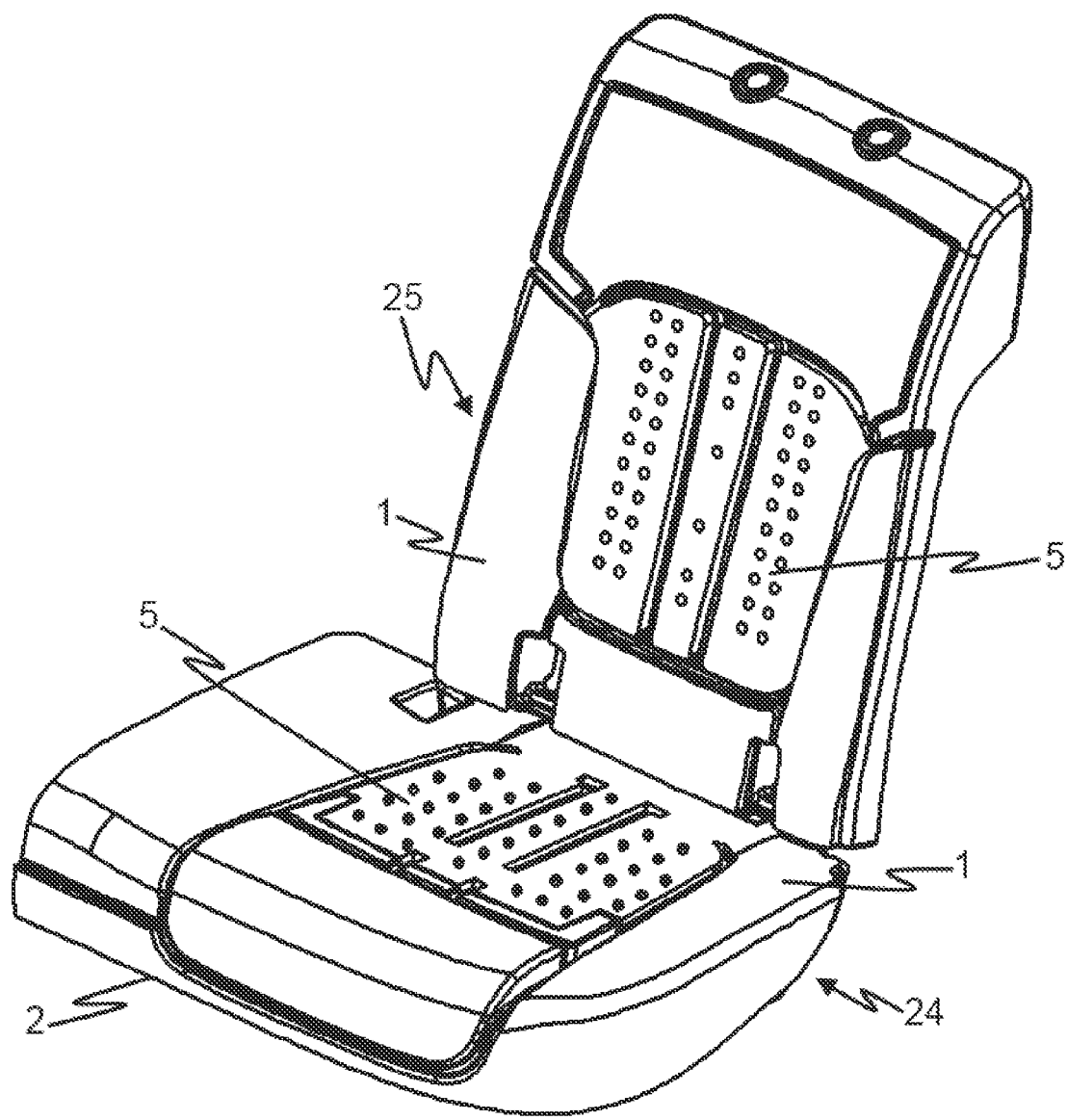
FIG. 4 is a schematic, perspective view of a vehicle seat without a seat covering with a view of the upholstery configuration where the seating surface that is shown essentially matches that of FIG. 2A.

FIG. 4 shows a schematic, perspective partial view of a vehicle seat for a front-seat configuration (rear-seat configuration) without seat covering whereby seating surface shown there essentially corresponds to that in FIG. 2A regarding its upholstery structure both of the seat-base upholstery 24 and the seat-back upholstery 25. One may see in this Figure how the ventilating insert 5 is mounted within the seat-base upholstery 24 and the seat-back upholstery 25. Of course, a front-seat arrangement (not shown) that also comprises at least one seat-base upholstery 24 and at least one seat-back upholstery 25 may each include a ventilating insert 5 based on the invention.

A diagonal ventilator is advantageously implemented as the ventilator 12 in the various embodiment examples described above in order on the one hand to suck air through the first sections of the surface 7, and on the other hand, to force that air through the second sections of the surface 8.

The air flow may also be reversed as necessary such that the air is sucked by the ventilator 12 via the second section of the surface 8 and forced through the first section of the surface 7.

Although not absolutely necessary, the ventilating insert 5 preferably includes an upper-side covering layer 18 covering the upper side and a lower-side covering layer 17 covering the underside. Moreover, the upper-side covering layer 18 and the lower-side covering layer 17 are connected together about the circumference of the air-distribution layer(s). It is also seen as advantageous to connect the upper-side covering layer 18 and the lower-side covering layer 17 at least about the circumference by means of a frame-shaped insert 20.

According to the illustrated embodiments, the ventilator 12 is placed or inserted into an indentation 13 on the upper side of the upholstery core 1, also known as the A-side. Although not required, a diagonal ventilator with several exhaust apertures may be used as the ventilator 12.

In order to provide a portion of the air sucked through the seating surface by means of the ventilating insert 5 additionally for provision through the seating surface, it is provided that the upholstery core 1 includes flow apertures that lead from the A-side of the upholstery core 1 through it to the B-side in order to exhaust the air from there into the area under the seat.

There has thus been shown and described a novel vehicle seat with a ventilating device which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

REFERENCE NUMBER LIST 1 upholstery core
2 underside of 1
3 upper side of 1
4 recess in 1
5 ventilating insert
6 upholstery covering
7 first section of surface
8 second section of surface
9 projection line/longitudinal dimension
10 air-distribution layer
11 intake side
12 ventilator
13 indentation 14 non-air-permeable foam layer
15 pass-through apertures
16 recess
17 lower-side covering layer
18 upper-side covering layer
19 apertures
20 frame-shaped insert
21 channel
22 tensioning groove
23 tensioning cable
24 seat-base upholstery
25 seat-back upholstery

The invention claimed is:

1. A motor vehicle seat, having an upper seat surface upon which a person sit and a ventilating device comprising (a) a ventilating insert that is placed into a recess on a side of an upholstery core facing the seat surface, (b) an air-permeable upholstery layer covering the side of the ventilating insert facing the seat surface, and (c) a ventilator, at least partially inserted into an indentation in the side of the upholstery core facing the seat surface, that sucks in the air from partial areas of the seat surface and provides it to those partial areas; wherein at least a portion of an air flow between the ventilator and the air-permable upholstery layer occurs via an air-distribution layer of the ventilating insert; wherein the ventilating insert is sub-divided into at least a first section of the seat surface, as viewed crosswise or along the seat direction, and at least a second section of the seat surface; wherein at least said first and said second sections possess separate flow; wherein at least said first section includes the air-distribution layer which is connected with an air intake side of the ventilator; and wherein the ventilator provides at least a portion of the air sucked in through at least said first section via at least said second section to the seat surface of the vehicle seat.

2. Vehicle seat according to claim 1, having at least one first section of the seat surface and at least two second sections of the seat surface, whereby a minimum of one section of the seat surface is located between at least two other sections of the seat surface.

3. Vehicle seat according to claim 1, wherein air passed from the ventilator to at least said second section of the seat surface flows at least partially via at least one portion of a recess forming a channel in an upper side of the upholstery core facing the seat surface.

4. Vehicle seat according to claim 1, wherein air passed from the ventilator to at least said second section of the seat surface flows at least partially via an air-distribution layer located in said second section of the seat surface.

5. Vehicle seat according to claim 1, wherein a portion of the air sucked from the ventilator via at least said first section of the seat surface is passed to an interior of the vehicle via an area located within a back of the vehicle seat.

6. Vehicle seat according to claim 1, having at least two first sections of the seat surface and at least one second section of the seat surface, whereby a minimum of one section of the seat surface is located between at least two other sections of the seat surface.

7. Vehicle seat according to claim 1, wherein the ventilating insert includes an upper-side covering layer on its side facing away from the upholstery core and a lower-side covering layer on its underside facing toward the upholstery core.

8. Vehicle seat according to claim 7, wherein the ventilating insert is surrounded by a frame-shaped insert that connects the upper-side covering layer and the lower-side covering layer together.

9. Vehicle seat according to claim 8, wherein the frame-shaped insert is formed of a foam-rubber material that is substantially non-air-permeable.

10. Vehicle seat according to claim 8, wherein at least one second section of the seat surface is formed of a foam-rubber material that is substantially non-air-permeable.

11. Vehicle seat according to claim 10, wherein the foam-rubber material of at least one second section of the seat surface forms a portion of the frame-shaped insert.

12. Vehicle seat according to claim 11, further comprising passageway apertures formed in the foam-rubber material of at least one second section of the seat surface, and wherein a recess in the upholstery core provides air to the seat surface via these passageway apertures.

* * * * *